(12) United States Patent
Matsui

(10) Patent No.: US 7,593,308 B2
(45) Date of Patent: Sep. 22, 2009

(54) OPTICAL HEAD DEVICE CAPABLE OF DETECTING THE OUTPUT LASER BEAM

(75) Inventor: Tsutomu Matsui, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 481 days.

(21) Appl. No.: 10/985,039

(22) Filed: Nov. 10, 2004

(65) Prior Publication Data
US 2005/0109915 A1 May 26, 2005

(30) Foreign Application Priority Data
Nov. 12, 2003 (JP) ............. P.2003-381979

(51) Int. Cl.
G11B 7/135 (2006.01)

(52) U.S. Cl. ............... 369/112.29; 369/116; 369/53.26; 369/47.5

(58) Field of Classification Search ............ 369/112.29, 369/53.26, 47.5, 116
See application file for complete search history.

(56) References Cited

U.S. PATENT DOCUMENTS 5,105,239 A * 4/1992 Uchino et al. ............. 257/82
5,600,621 A * 2/1997 Noda et al. ............... 369/53.26
2003/0223340 A1 * 12/2003 Miyake et al. ............ 369/53.26

FOREIGN PATENT DOCUMENTS

| JP | 56007250 A | * | 1/1981 |
| JP | A-56-7250 | | 1/1981 |
| JP | 4-330646 | | 11/1992 |
| JP | 6-309685 | | 11/1994 |
| JP | 11-134705 | | 5/1999 |
| JP | 11-273119 | | 10/1999 |
| JP | A-2001-84635 | | 3/2001 |
| JP | A-2002-319699 | | 10/2002 |

* cited by examiner

Primary Examiner—Wayne R Young
Assistant Examiner—LaTanya Bibbins
(74) Attorney, Agent, or Firm—Morgan Lewis & Bockius LLP

(57) ABSTRACT

The optical head device includes a semiconductor laser for emitting a laser beam having an elliptical beam shape; a collimator lens for collimating the laser beam emitted from the semiconductor laser; a reflector including pair of belt-like pieces one of the surfaces of which is used as a reflecting face formed in a curved face having a curvature along their longitudinal direction, the pair of belt-like pieces being formed to be arranged in a major axis direction of an elliptical beam flux to sandwich the optical axis of the laser beam, and an optical sensor equipped with a condenser lens for detecting the strength of the beam reflected from the pair of belt-like pieces of the reflector.

4 Claims, 2 Drawing Sheets

OPTICAL HEAD DEVICE CAPABLE OF DETECTING THE OUTPUT LASER BEAM

BACKGROUND OF THE INVENTION

1. Field of the Invention

This invention relates to an optical head device for carrying out recording or reproducing of data by irradiating a recording face of an optical disk with a laser beam, and more particularly to a technique usefully applied to a laser beam detecting mechanism which intends to adjust the output of the laser beam.

2. Description of the Related Art

For example, in an optical head device for carrying out recording/reproducing for a CD (compact disk), DVD (digital versatile disk), an optical disk for a blue-violet laser, etc., it has been conventionally known to detect the output strength of the laser beam to adjust the output of the laser beam by feedback control.

Traditionally, as previously known methods for detecting the output strength of the laser beam, there were a method of detecting a part of the laser beam branched by a prism or the like from the laser beam traveling to an optical disk, a method of detecting the laser beam spread outward from the laser beam emitted from a semiconductor laser and received by an optical sensor, and a method of detecting the laser beam thus spread outward and reflected by a reflecting plate using the optical sensor (for example, JP-A-56-7250, JP-A-2001-84635 and JP-A-2002-319699).

However, when the output strength of the laser beam is detected in such a manner that a part of the laser beam branched by the prism or the like is detected, power loss of the laser beam to be employed for read/write of data occurs disadvantageously. The power loss of the laser beam is a serious problem because a high laser output is required for data recording, particularly for improvement of the recording speed.

The method of detecting the laser beam spread outward from the center in order to detecting the output strength of the laser beam presents a problem that it is difficult to acquire a quantity of light necessary for detection. Since the laser beam has high directivity, its quantity of light extremely decreases from the center toward the outside. Therefore, in order to directly detect the beam deviated to the outside by an optical sensor, an optical sensor must be arranged at the position in the close proximity of an opening of a collimator. If the optical sensor is deviated outward from that position, the detected quantity of light extremely decreases. As a result, it is difficult to mount the optical sensor appropriately.

In order to prevent reduction in the quantity of light, if the optical sensor provided with a condenser lens in front of an optical element is employed, inversely, because of hindrance by the condenser lens, the sensor element cannot be arranged in the close proximity of the opening of the collimator. As a result, the quantity of light which reaches the sensor element is reduced.

Where the beam deviated from the center to the outside is reflected by a reflecting mirror (reflecting plate) so that the reflected beam is detected, if any means is not provided as in JP-A-56-7250, the weak light deviated from the center of the laser beam is further scattered to reach the optical senor. Thus, a required quantity of light cannot be obtained. Otherwise, the reflecting plate must be arranged near to the center of the laser beam. In this case, the power loss of the laser beam occurs as in the case of branching of the laser beam by the prism.

Further, as disclosed in JP-A-2001-84635, if the reflected light is focused at the position of the sensor element of the optical sensor through a lens, the reflecting mirror and optical sensor must be arranged with high accuracy in their attaching position and angle. This leads to a problem of an increase in assembling cost.

JP-A-2002-319699 discloses that the reflecting mirror is formed in a concave shape like the inside of an elliptical globe so that the reflected light is focused at the position of the sensor element of the optical sensor. However, such a configuration makes it difficult to mold the reflecting mirror appropriately. This leads to problems of increasing component cost, and of requiring high accuracy in the attaching position and angle.

SUMMARY OF THE INVENTION

An object of this invention is to provide an optical head provided with a laser output detecting mechanism which does not incur power loss in a laser beam applied to an optical disk, does not require so high an accuracy in assembling components, and can prevent component cost from rising.

In order to attain the above object, in accordance with this invention, there is provided an optical head device for carrying out recording or reproducing of data by irradiating a recording face of an optical disk with a laser beam, including: a semiconductor laser for emitting a laser beam having an elliptical beam shape; a collimator lens for collimating the laser beam emitted from the semiconductor laser; a reflector including a pair of belt-like pieces one of surfaces of which is used as a reflecting face formed in a curved face having a curvature along their longitudinal direction, a supporting piece for supporting the one side of each of the pair of belt-like pieces so that the pair of belt-like pieces are arranged apart from each other in a direction vertical to their longitudinal direction and a fixing piece screw-fixed to a frame of the optical head device; an optical sensor equipped with a condenser lens for detecting the strength of the laser beam reflected from the pair of belt-like pieces, wherein the pair of belt-like pieces of the reflector are arranged between the semiconductor laser and the collimator lens so that their longitudinal direction is set at the same direction as a minor axis direction of an elliptical beam of the laser beam and an optical axis of the laser beam is located between the pair of belt-like pieces.

In accordance with the configuration described above, for a laser beam which spreads in an elliptical beam shape like the semiconductor laser, both sides of the laser beam in its major axis are reflected by the pair of belt-like pieces to detected the strength of the laser beam so that the laser beam with a relatively high strength can be supplied to the optical sensor without incurring power loss of the laser beam incident on the collimator lens.

Further, although the reflector includes pair of belt-like pieces with reflecting faces each formed in a curved face and others, the reflecting face has only to have a rough curved face having a curvature in one direction (e.g. the inner face of a cylinder). Therefore, as compared with the case where the reflecting face is formed like the inside of an elliptical globe so that the reflected beam is focused, the reflector according to this invention can be manufactured at very low cost, thereby permitting the production cost to be reduced.

Further, the reflector roughly condenses the reflected light by means of the above curved face, whereas the condenser lens of the optical sensor takes in the reflected beam in a predetermined range to detect the quantity of light. For this reason, the accuracy of mounting the reflector and the optical sensor is not required to be so high, thereby permitting the cost of the assembling step to be reduced.

Since so high accuracy is not required to mount the reflector and the optical sensor, for example, the space used for fine adjustment of the position and angle of mounting them is not required. Thus, they can be mounted in a small space, thereby permitting the whole optical head device to be downsized. For example, a mounting structure can be also realized in which the reflector is positioned with its one side in contact with the device frame and secured at the other side by screw-fixing.

As described above, in accordance with this invention, in the laser beam output detecting mechanism of the optical head device does not incur the power loss of the laser beam applied to the optical disk, permits components to be mounted without requiring not so high an accuracy and prevent the production cost of components from rising.

Further, in accordance with this invention, the entire optical head device can be downsized.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
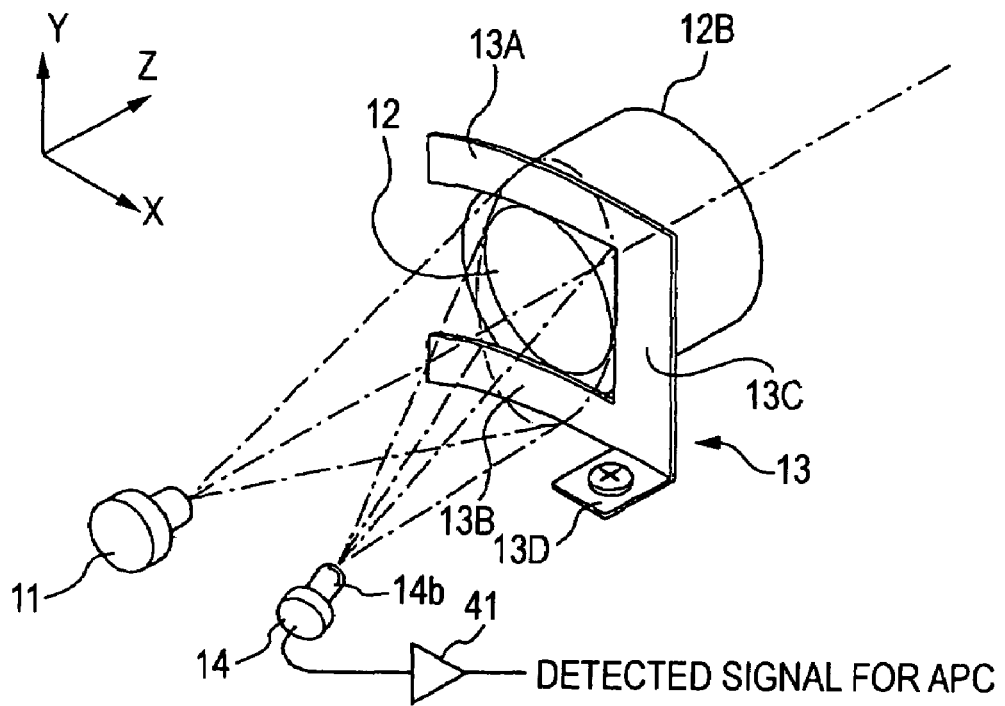
FIG. 1 is a perspective view of a part of a beam detecting mechanism for APC (Automatic Power Control) in an optical head device according to an embodiment of this invention.

Now referring to the drawings, an explanation will be given of an embodiment of this invention.

Figure 2:
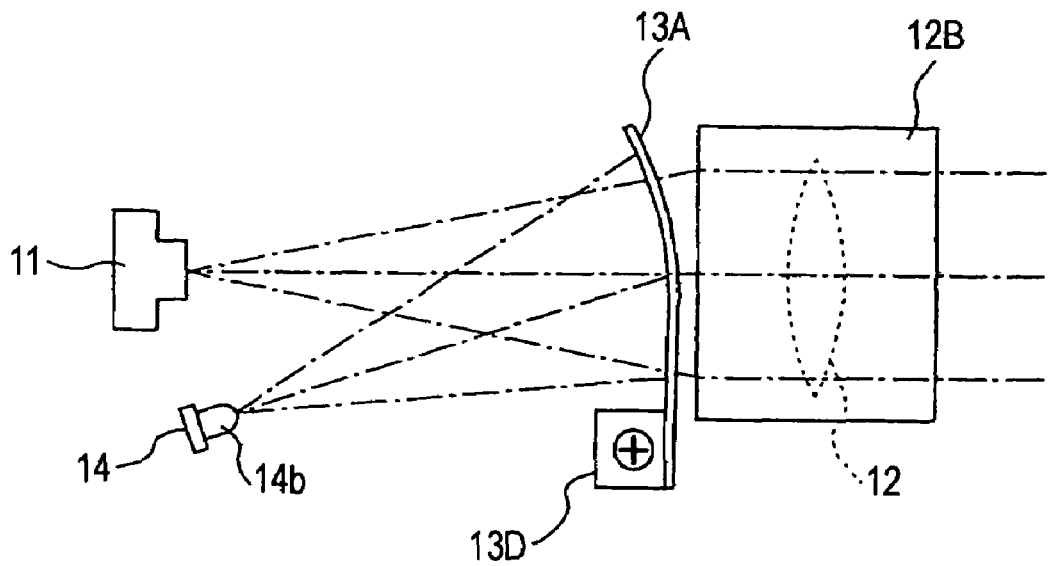
FIG. 2 is a plan view of the beam detecting mechanism for APC (Automatic Power Control) of FIG. 1.
Figure 3:
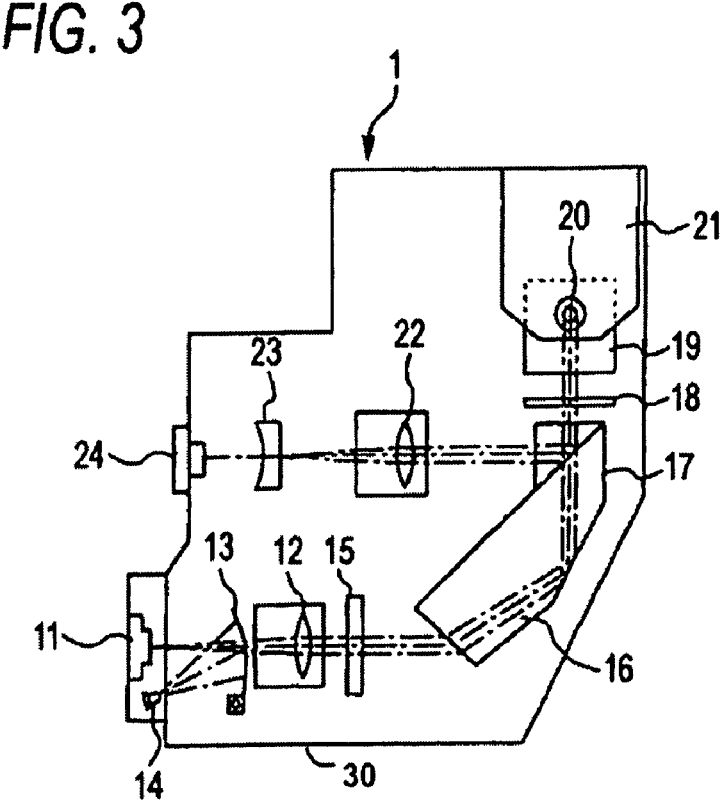
FIG. 3 is a view showing the entire configuration of this optical head device according to this embodiment.

FIG. 1 is a perspective view of a part of a beam detecting mechanism for APC (Automatic Power Control) in an optical head device according to an embodiment of this invention. FIG. 2 is a plan view thereof. FIG. 3 is a view showing the entire configuration of this optical head device.

An optical head device 1 according to this embodiment serves to carry out the recording/reproducing of data on the recording face of e.g. a writable DVD. As seen from FIG. 3, the optical head device 1 includes a semiconductor laser 11 serving as a laser output unit, a collimator lens 12 for collimating a laser beam emitted from the semiconductor laser 11, a reflecting plate 13 for reflecting the emitted beam spread to the outside of the semiconductor laser 11, an APC optical sensor 14 for detecting the strength of the beam reflected by the reflecting plate 13, a diffraction grating 15 for making a plurality of beams from the collimated laser beam for focus control and tracking control, a prism 16 for bending an optical axis, a PBS (polarized beam splitter) 17 for separating a traveling beam to an optical head and a reflected beam from the optical disk from each other, a ¼ wavelength plate 18 for rotating the polarized beams of the traveling beam and reflected beam by 90 degree, an actuating mirror 19, an objective lens 20 for converging the laser beam on the recording face of the optical disk, an objective lens driving device 21 for driving this objective lens 20 in a focus direction and a tracking direction, a lens 22 for converging the reflected beam separated by the PBS 17, a concave cylindrical lens 23 for providing astigmatism to the reflected beam for the focus control and tracking control, and a 8-division sensor 24 for detecting the strength of the reflected.

These components are secured to a frame 30 molded by e.g. Zn die-cast and a heatsink (not shown) of aluminum to constitute the optical head device 1. The optical head device 1 is mounted on a disk driving device (not shown). Further, the wirings of semiconductor laser 11 and optical sensors 14, 24 and objective lens driving device 21 are connected to a control base plate of the disk driving device. In such an arrangement, a signal is inputted or outputted to make predetermined operations. For example, the signal detected by the APC optical sensor 14 is supplied to the APC circuit on the control base plate through an amplifier 41 (FIG. 1). The APC circuit makes the feedback control on the basis of the detected signal, thereby making auto-power control so that the output from the semiconductor laser 11 is kept constant.

As seen from FIGS. 1 and 2, the reflecting plate 13 is composed of a pair of upper and lower belt-like pieces 13A, 13B which are longitudinal in an X direction, a supporting piece 13C which supports these belt-like pieces 13A, 13B, respectively, and a fixing piece 13D which projects from the lower side of the supporting piece 13C and is screw-fixed to the frame 30. The reflecting plate 13 is fixed to the frame 30 by screw-fixing the reflecting plate 13 to the frame 30 in a state where the tips of the belt-like pieces 13A, 13B are positioned in contact with grooves (not shown) formed in the frame 30.

Now it is assumed that X direction denotes a minor axis direction of an elliptical beam flux emitted from the semiconductor laser, Y direction denotes a major axis direction of the elliptical beam flux and Z direction denotes a traveling direction of the elliptical beam flux.

The belt-like pieces 13A, 13B are formed to be arranged in the Y direction so that they are apart from each other by an interval approximately equal to the aperture of the collimator lens 12. At a position immediately in front of the collimator lens 12 or a lens holder thereof, these belt-like pieces 13A, 13B are arranged on the upper and lower sides of the aperture of the collimator lens 12 so that they do not close the aperture.

For example, Ni or Au are evaporated on the reflecting faces of the belt-like pieces 13A, 13B (faces on the side of the semiconductor laser 11) to give high reflectivity. Otherwise, a "gold tape" or "silver tape" in which a gold or silver metallic film is formed on an adhesive layer may be affixed to give the high reflectivity.

Each of the reflecting faces of the belt-like pieces 13A, 13B constitutes a curved face having a curvature along the X direction. Specifically, on the section of a X-Z plane, the reflecting face constitutes an arc-shaped curved face. Thus, the reflected beam of the laser beam is roughly condensed. This reflecting face is also formed to have no curvature in the Y-direction. This facilitates its molding and reduces the production cost. Incidentally, to the degree of not increasing the cost, the reflecting face may have the curvature in the Y direction so that the reflected beam is roughly condensed.

Of the upper and lower belt-like pieces 13A and 13B, the reflecting face of the upper belt-like piece 13A is formed to lean slightly downward whereas that of the lower belt-like piece 13B is formed to lean slightly upward so that the reflected beams from both reflecting faces go toward the APC optical sensor 14.

As seen from FIGS. 1 and 2, the APC optical sensor 14 is provided with a condenser lens 14*b* arranged in front of a detecting element such as a photodiode. The beam applied to the condenser lens 14*b* is guided to the detecting element so that the total strength of the laser beam is detected.

Figure 4:
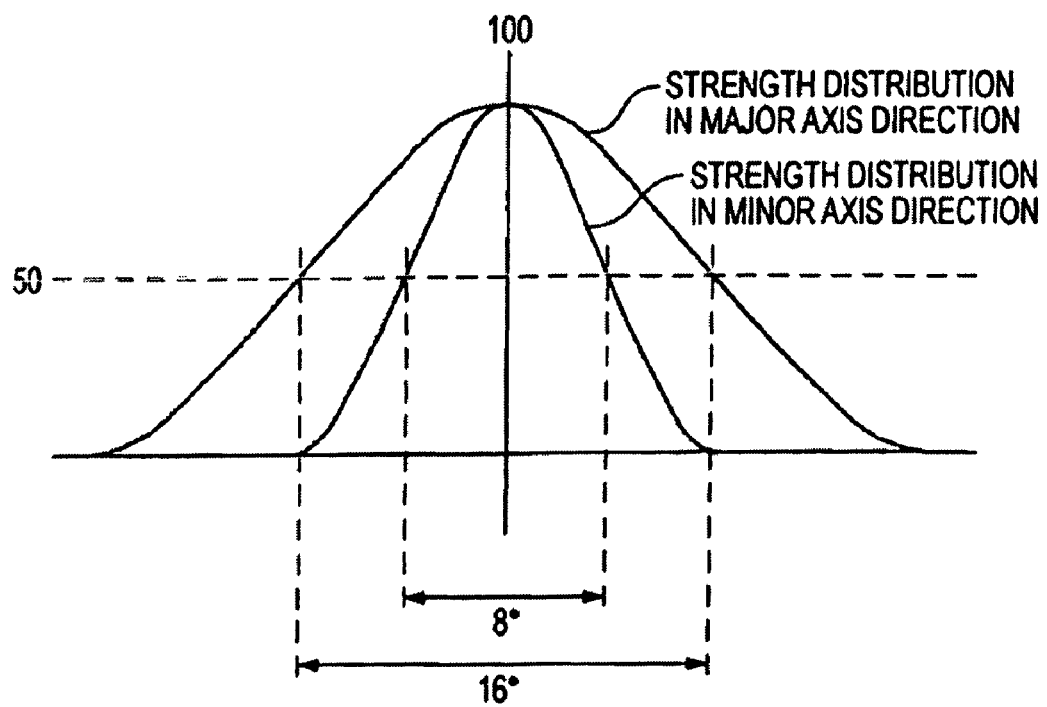
FIG. 4 is a graph showing the strength distribution of a semiconductor laser which explains the range incident to the collimator lens of a laser beam and the range reflected for APC detection.

FIG. 4 is a graph showing the strength distribution of the semiconductor laser which explains the range incident on the collimator lens 12 of the output from the semiconductor laser and the range reflected by the reflecting plate.

The semiconductor laser 11 according to this embodiment emits the beam flux with an elliptical constant-pressure line. Specifically, the strength of the beam flux is lower at a position farther from the center. In this case, in the strength distribution in the Y-axis direction, the spreading angle where the strength is half of the peak value at the center is about 8. whereas in the strength distribution in the X-axis direction, this spreading angle is as large as about 16. This is a characteristic of a general semiconductor laser.

Although not being limited, in accordance with this embodiment, the elliptical beam flux incident on the collimator lens 12 is that included in the spreading angle of about 8. Therefore, of the laser beam deviated from the collimator lens 12, in the X-direction, only the beam with low strength remains, whereas in the Y-direction, the beam with high strength higher than half of the peak value remains.

In this embodiment, the semiconductor laser 11 is fixed at a rotating angle determined so that the major axis of the elliptical beam flux is oriented to the Y-direction and hence the beam with high strength is incident on the belt-like pieces 13A, 13B of the above reflecting plate 13.

As described above, in accordance with the optical head device 1 according to this embodiment, since the beam in the major axis of the elliptical beam flux is reflected and employed to detect the output from the laser beam, without incurring the power loss of the laser beam incident on the collimator lens 12, a relatively large quantity of light can be guided to the APC optical sensor 14.

The reflecting face of the reflecting plate 13 has only a simple curved face similar to the inner face of a cylinder. Therefore, as compared with the case where a fine curved face is accurately formed so that the reflected beam of the elliptical beam flux is focused, the reflecting plate according to this invention can be manufactured at very low cost, thereby permitting the component cost to be reduced.

Further, the reflecting plate 13 roughly condenses the reflected light by means of the belt-like pieces 13A, 13B, whereas the APC optical sensor 14 takes in the reflected beam in a range of the condenser lens 14b to detect the quantity of light. For this reason, the accuracy of mounting the reflecting plate 13 and the APC optical sensor 14 is not required to be so high, thereby permitting the cost of the assembling step to be reduced.

Since high accuracy is not required to mount the reflecting plate 13 and the APC optical sensor 14, for example, the space used the position and angle of attaching them is not required. Thus, they can be mounted in a small space, thereby permitting the optical head device 1 to be downsized.

Additionally, this invention should not be limited to the above embodiment, but various modifications thereof can be realized. For example, the substance or detailed shape of the reflecting plate 13 can be appropriately changed without departing from the spirit of this invention. Further, various modifications can be appropriately made for the kind of the optical disk to which this invention is applied and configuration of the optical system of the optical head device.

What is claimed is:

1. An optical head device for carrying out recording or reproducing of data by irradiating a recording face of an optical disk with a laser beam, comprising:

a semiconductor laser for emitting a laser beam having an elliptical beam shape;

a collimator lens for collimating the laser beam emitted from the semiconductor laser;

a reflector including a pair of belt-like pieces one of surfaces of which is used as a reflecting face formed in a curved face having a curvature along their longitudinal direction, a supporting piece for supporting the one side of each of the pair of belt-like pieces so that the pair of belt-like pieces are arranged apart from each other in a direction vertical to their longitudinal direction and a fixing piece fixed to a frame of the optical head device;

an optical sensor including a condenser lens for detecting the strength of the laser beam reflected from the pair of belt-like pieces, wherein the pair of belt-like pieces of the reflector are arranged between the semiconductor laser and the collimator lens so that their longitudinal direction is set at the same direction as a minor axis direction of an elliptical beam of the laser beam and an optical axis of the laser beam is located between the pair of belt-like pieces.

2. An optical head device for carrying out recording or reproducing of data by irradiating a recording face of an optical disk with a laser beam, comprising:

a laser output unit for emitting the laser beam having an elliptical beam shape;

a collimator lens for collimating the laser beam emitted from the laser output unit;

a reflector including an opening, and one of surfaces of which is used as a reflecting face formed in a curved face;

an optical sensor for detecting the strength of the laser beam reflected from the reflector, wherein:

the reflector is arranged between the semiconductor laser and the collimator lens;

an optical axis of the laser beam is located at the opening of the reflector, the reflector includes a pair of belt-like pieces one of surfaces of which is used as the reflecting face formed in the curved face having a curvature along their longitudinal direction, the pair of belt-like pieces are arranged apart from each other in a direction vertical to their longitudinal direction;

the pair of belt-like pieces of the reflector are arranged between the semiconductor laser and the collimator lens so that their longitudinal direction is set at the same direction as a minor axis direction of an elliptical beam of the laser beam; and an optical axis of the laser beam is located between the pair of belt-like pieces.

3. The optical head device according to claim 2, wherein the reflecting face is formed in a curved face having a curvature along a minor axis direction of an elliptical beam of the laser beam and an optical axis of the laser beam is located between the pair of belt-like pieces.

4. The optical head device according to claim 2, wherein the reflector includes the pair of belt-like pieces, a supporting piece for supporting the one side of each of the pair of belt-like pieces, and a fixing piece which projects from the supporting piece and is fixed to a frame of the optical head device.

* * * * *